(12) United States Patent
Niimura

(10) Patent No.: US 12,273,042 B2
(45) Date of Patent: Apr. 8, 2025

(54) POWER CONVERSION SYSTEM AND POWER CONVERSION CONTROL METHOD

(71) Applicant: TMEIC Corporation, Chuo-ku (JP)

(72) Inventor: Naoto Niimura, Tokyo (JP)

(73) Assignee: TMEIC CORPORATION, Chuo-ku (JP)

(*) Notice: Subject to any disclaimer, the term of this patent is extended or adjusted under 35 U.S.C. 154(b) by 0 days.

(21) Appl. No.: 18/007,214

(22) PCT Filed: Jan. 8, 2021

(86) PCT No.: PCT/JP2021/000585
§ 371 (c)(1),
(2) Date: Jan. 27, 2023

(87) PCT Pub. No.: WO2022/149288
PCT Pub. Date: Jul. 14, 2022

(65) Prior Publication Data
US 2024/0258906 A1    Aug. 1, 2024

(51) Int. Cl.
*H02M 5/458*    (2006.01)

(52) U.S. Cl.
CPC .................... *H02M 5/458* (2013.01)

(58) Field of Classification Search
CPC ........ H02M 5/44; H02M 5/453; H02M 5/458; H02M 5/4585
See application file for complete search history.

(56) References Cited

U.S. PATENT DOCUMENTS

| 2016/0190972 A1* | 6/2016 | Mori | H02M 7/5395 |
| | | | 318/490 |
| 2017/0063252 A1* | 3/2017 | Fukumaru | H02M 7/5387 |
| 2020/0177102 A1* | 6/2020 | Mori | H02M 7/53871 |

FOREIGN PATENT DOCUMENTS

JP    2015-43660 A    3/2015

* cited by examiner

*Primary Examiner* — Alex Torres-Rivera
(74) *Attorney, Agent, or Firm* — Oblon, McClelland, Maier & Neustadt, L.L.P.

(57) ABSTRACT

According to an embodiment, a power conversion system includes a plurality of converters and a control unit. The plurality of converters are provided in parallel for each phase of a multi-phase alternating current power system. The control unit uses a plurality of carrier signals having a prescribed phase difference from each other in carrier comparison type pulse width modulation (PWM) control. The control unit detects a current of a primary side of the plurality of converters at each of four or more even-numbered timings when the four or more even-numbered timings are defined at prescribed time intervals during one cycle of a specific carrier signal among the plurality of carrier signals. The control unit generates a reference voltage for the PWM control using a value of the detected current of the primary side and a value of a reference current of the primary side and updates the reference voltage at each of the four or more even-numbered timings. The control unit controls a specific converter among the plurality of converters using the specific carrier signal and the updated reference voltage.

13 Claims, 11 Drawing Sheets

POWER CONVERSION SYSTEM AND POWER CONVERSION CONTROL METHOD

TECHNICAL FIELD

Embodiments of the present invention relate to a power conversion system and a power conversion control method.

BACKGROUND ART

A power conversion system is configured to include a power converter having a switching element and is interconnected to a multi-phase alternating current (AC) power system. Although switching ripple is caused on the power system side due to an operation of the power converter, it is desirable to further reduce the switching ripple. On the other hand, the power conversion system is required to further improve the control responsiveness of current control on the power system side.

CITATION LIST

Patent Literature

[Patent Literature 1]
 Japanese Unexamined Patent Application, First Publication No. 2015-43660

SUMMARY OF INVENTION

Technical Problem

An objective of the present invention is to provide a power conversion system and a power conversion control method capable of further improving the control responsiveness of current control on a power system side.

Solution to Problem

According to an embodiment, a power conversion system is interconnected to a multi-phase AC power system. The power conversion system includes a plurality of converters and a control unit. The plurality of converters are provided in parallel for each phase of the power system. The control unit controls the plurality of converters according to carrier comparison type pulse width modulation (PWM) control using a plurality of carrier signals having a prescribed phase difference from each other. The control unit detects a current of a primary side of the plurality of converters at each of four or more even-numbered timings when the four or more even-numbered timings are defined at prescribed time intervals during one cycle of a specific carrier signal among the plurality of carrier signals. The control unit generates a reference voltage for the PWM control using a value of the detected current of the primary side and a value of a reference current of the primary side and updates the reference voltage at each of the four or more even-numbered timings. The control unit controls a specific converter among the plurality of converters using the specific carrier signal and the updated reference voltage.

DESCRIPTION OF EMBODIMENTS

Hereinafter, a power conversion system and a power conversion control method of embodiments will be described with reference to the drawings. The power conversion system to be described below supplies desired AC power to a motor, which is an example of a load. The power conversion system of the embodiment includes a power converter formed to be interconnected to an AC power system. A connection described in the embodiments includes an electrical connection.

Figure 1:
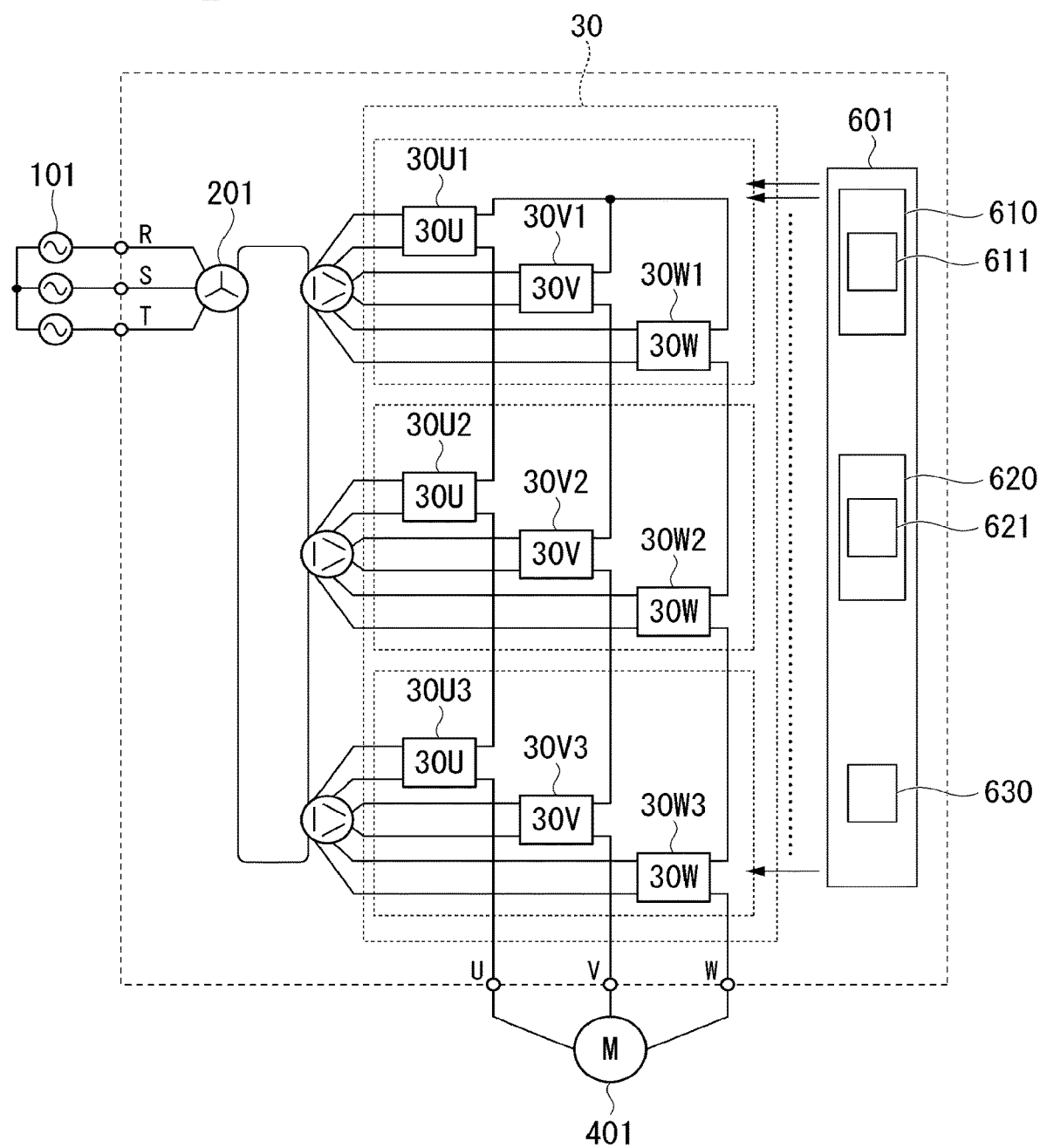
FIG. 1 is a diagram showing an example of a power conversion system according to an embodiment.

First, an overall electrical configuration of a power conversion system 1 will be described. FIG. 1 is a diagram showing an example of the power conversion system 1 of the embodiment. The power conversion system 1 includes, for example, a transformer 201, a power converter 30, and a control unit 601.

The power conversion system 1 includes AC input terminals R, S, and T and is connected to AC power supplies 101 (power systems) via these terminals. The power conversion system 1 includes AC output terminals U, V, and W and is connected to a motor 401 via these terminals.

Primary windings of the transformer 201 are connected to the AC input terminals R, S, and T and an AC input side of the power converter 30 is connected to secondary windings of the transformer 201. The AC output side is connected to the AC output terminals U, V, and W.

The control unit 601 controls a process of turning on/off switching elements inherent in cell converters 30U, 30V, and 30W. The cell converters 30U, 30V, and 30W are collectively referred to as a plurality of cell converters 30X.

Next, parts of the power conversion system 1 will be described.

The transformer 201 includes primary-side windings and secondary-side windings having a three-group configuration. The primary-side windings are formed by three-phase star-connected wires. The secondary-side windings are formed by three-phase open delta-connected wires isolated from each other. Three-phase AC power is supplied from the AC power supply 101 to the transformer 201. The transformer 201 transforms the voltage of the AC power supplied from the AC power supply 101 into a desired voltage based on a turn ratio and supplies the AC power of the transformed voltage to each of the plurality of cell converters 30X.

The power converter 30 includes the plurality of cell converters 30X. In the present embodiment, the plurality of cell converters 30X include three first-phase cell converters 30U (30U1, 30U2, and 30U3) and three second-phase cell converters 30V (30V1, 30V2, and 30V3), and three third-phase cell converters 30W (30W1, 30W2, and 30W3). Each cell converter 30X is a single-phase converter, converts single-phase AC power supplied from the secondary winding of the transformer 201 into direct current (DC) power, converts the DC power after the conversion into single-phase AC power having a desired frequency and voltage, and outputs the single-phase AC power. The cell converters 30X have the same circuit configuration. Details of the circuit configuration will be described below.

A first phase of a first group on the secondary side of the transformer 201 is connected to the input of the cell converter 30U1. A second phase of the first group on the secondary side of the transformer 201 is connected to the input of the cell converter 30V1. A third phase of the first group on the secondary side of the transformer 201 is connected to the input of the cell converter 30W1.

A first phase of a second group on the secondary side of the transformer 201 is connected to the input of the cell converter 30U2. A second phase of the second group of the secondary side of the transformer 201 is connected to the input of the cell converter 30V2. A third phase of the second group of the secondary side of the transformer 201 is connected to the input of the cell converter 30W2.

A first phase of a third group on the secondary side of the transformer 201 is connected to the input of the cell converter 30U3. A second phase of the third group on the secondary side of the transformer 201 is connected to the input of the cell converter 30V3. A third phase of the third group on the secondary side of the transformer 201 is connected to the input of the cell converter 30W3.

Outputs of the three first-phase cell converters 30U1, 30U2, and 30U3 are connected in series in that order. Likewise, the three second-phase cell converters 30V1, 30V2, and 30V3 and the three third-phase cell converters 30W1, 30W2, and 30W3 are also connected in series for each phase.

The output of the cell converter 30U1 on the side, which is not connected to the cell converter 30U2, the output of the cell converter 30V1 on the side, which is not connected to the cell converter 30V2, and the output of the cell converter 30W1 on the side, which is not connected to the cell converter 30W2, are connected to each other to form a three-phase AC neutral point of the load circuit.

The output of the cell converter 30U3 on the side, which is not connected to the cell converter 30U2, is connected to the AC output terminal U and is connected to a U-phase winding of the motor 401 via the AC output terminal U. The output of the cell converter 30V3 on the side, which is not connected to the cell converter 30V2, is connected to the AC output terminal V and is connected to a V-phase winding of the motor 401 via the AC output terminal V. The output of the cell converter 30W3 on the side, which is not connected to the cell converter 30W2, is connected to the AC output terminal W and is connected to a W-phase winding of the motor 401 via the AC output terminal W.

The control unit 601 controls the plurality of cell converters 30X. For example, the control unit 601 includes a first control unit 610, a second control unit 620, and a third control unit 630. The first control unit 610 controls the plurality of cell converters 30X applied as converters to be described below. The first control unit 610 includes, for example, a converter control unit 611. The second control unit 620 controls the plurality of cell converters 30X applied as inverters to be described below. The second control unit 620 includes, for example, an inverter control unit 621. The third control unit 630 monitors a control state of the power conversion system 1 and makes an adjustment such that a control process is performed stably. For example, the third control unit 630 includes a timer and generates an interrupt signal having a prescribed cycle.

For example, the converter control unit 611 controls each cell converter 30X by sending a signal for controlling a switching element included in each cell converter 30X to each cell converter 30X on the basis of information indicating a current flowing through the secondary windings (FIGS. 2A and 2B) of the transformer 201 detected by a current sensor 301 (FIG. 3A) to be described below.

According to this configuration, the power conversion system 1 can convert the AC power supplied from the AC power supply 101 into three-phase AC power having a desired frequency and a desired voltage and supply the AC power to the motor 401. Details of the converter control unit 611 will be described below.

Figure 2A:
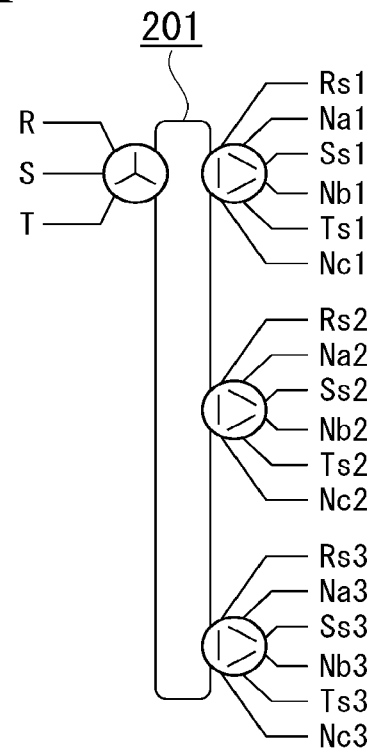
FIG. 2A is a circuit diagram showing a winding structure of a transformer according to the embodiment.
Figure 2B:
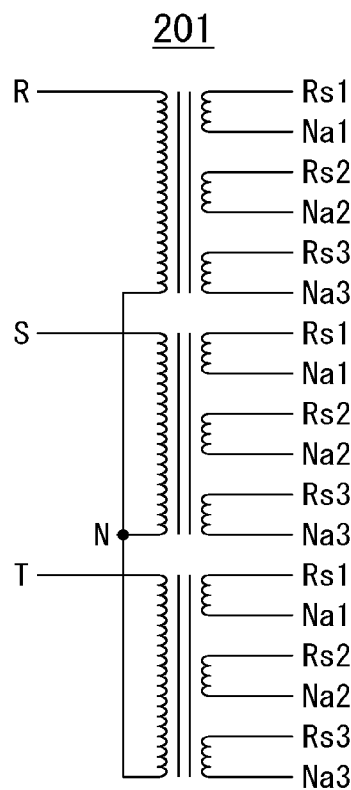
FIG. 2B is a circuit diagram showing a winding structure of the transformer according to the embodiment.

FIGS. 2A and 2B are circuit diagrams showing the winding structure of the transformer 201 of the embodiment. Although the primary windings (the input side) become star (Y)-connected wires, this is an example and delta (Δ)-connected wires may be used. The secondary windings (the output side) become open windings in which the three-phase windings are electrically separated into single phases.

In the example of FIG. 2B, assuming that the neutral point for the star-connected wires is denoted by N, voltages applied between R and N, between S and N, and between T and N are multiplied by a turn ratio and appear between Rs1 and Na1, between Ss1 and Nb1, and between Ts1 and Ne1 in the first group of the secondary side. A phase between Rs1 and Na1, a phase between Ss1 and Nb1, and a phase between Ts1 and Ne1 in the first group of the secondary side correspond to the first phase, the second phase, and the third phase in the first group of the secondary side, respectively.

The same is true for the second group of the secondary side and the third group of the secondary side. Voltages multiplied by a turn ratio also appear between Rs2 and Na2, between Ss2 and Nb2, between Ts2 and Nc2 in the second group of secondary side and between Rs3 and Na3, between Ss3 and Nb3, and between Ts3 and Nc3 in the third group of the secondary side as in the first group. A phase between Rs2 and Na2, a phase between Ss2 and Nb2, and a phase between Ts2 and Nc2 in the second group of the secondary side correspond to the first phase, the second phase, and the third phase in the second group of the secondary side, respectively. A phase between Rs3 and Na3, a phase between Ss3 and Nb3, and a phase between Ts3 and Nc3 in the third group of the secondary side correspond to the first phase, the second phase, and the third phase in the third group of the secondary side, respectively.

Figure 3A:
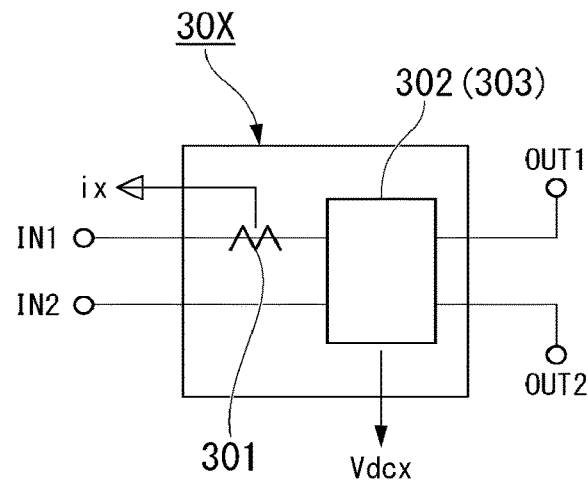
FIG. 3A is a circuit diagram showing an internal configuration of a cell converter according to the embodiment.
Figure 3B:
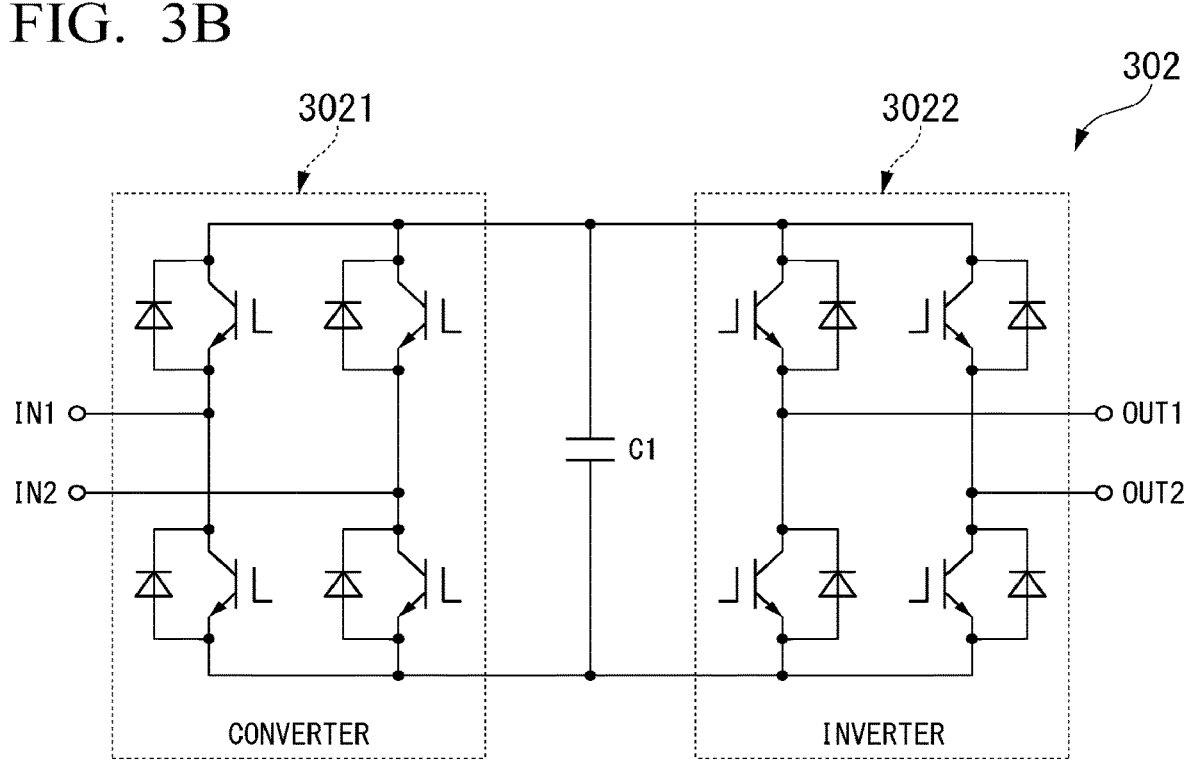
FIG. 3B is a circuit diagram showing an internal configuration of the cell converter according to the embodiment.
Figure 3C:
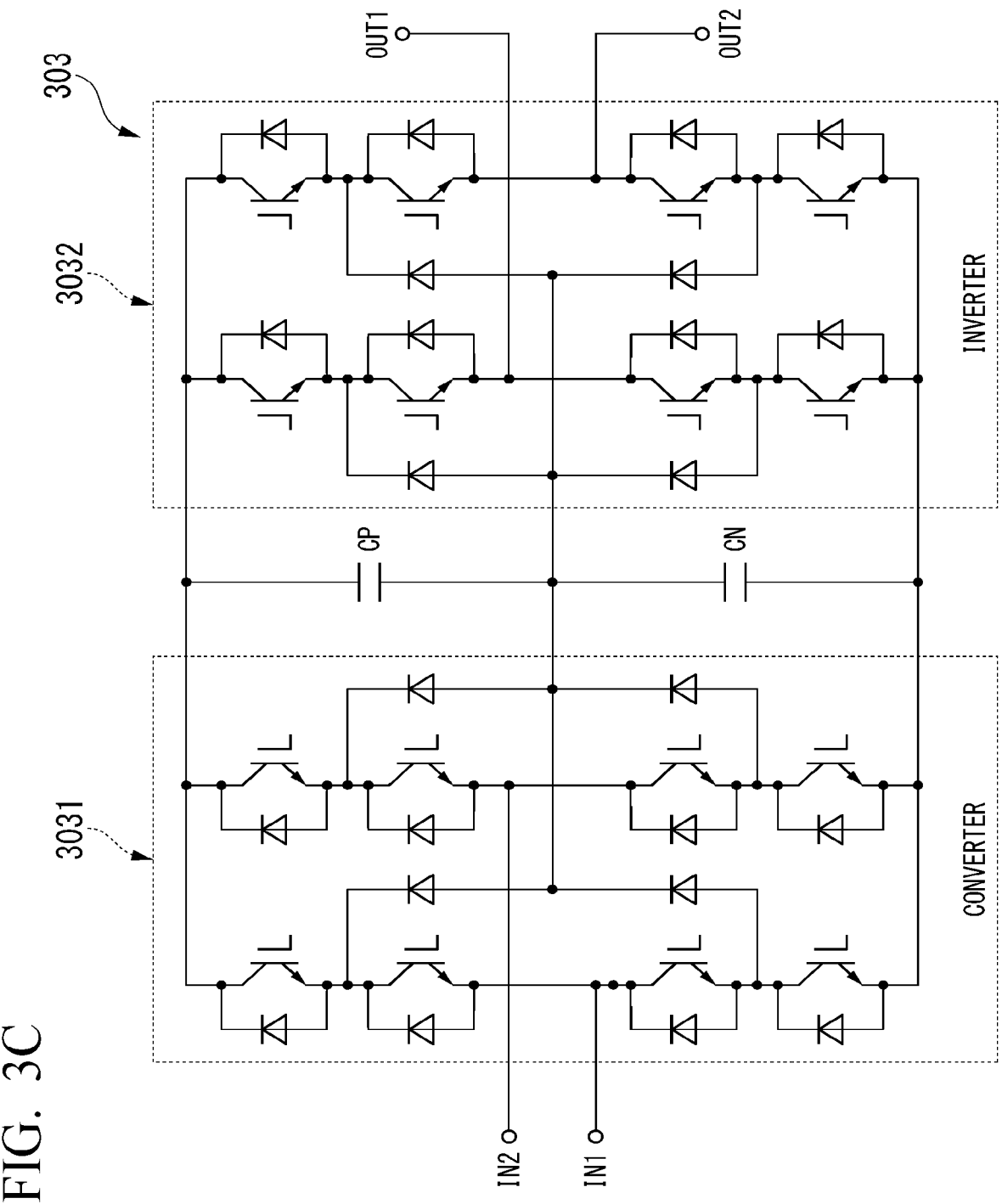
FIG. 3C is a circuit diagram showing an internal configuration of the cell converter according to the embodiment.

FIGS. 3A to 3C are circuit diagrams showing an internal configuration of the cell converter 30X (X: U, V, W) of the embodiment. As shown in FIG. 3A, the cell converter 30X has input terminals IN1 and IN2 and output terminals OUT1 and OUT2. For example, the cell converter 30X includes a current sensor (a current transformer) 301 and a cell converter main body 302. The current sensor 301 detects a current flowing between the input terminals IN1 and IN2. A magnitude of this current is denoted by ix. x denotes an identifier that identifies the number of stages and may be, for example, a natural number.

FIGS. 3B and 3C show configuration examples when the cell converter 30X is a so-called two-level converter and a so-called three-level converter, respectively, and either of them may be adopted.

The cell converter main body 302 shown in FIG. 3B includes a two-level converter in which the AC side potential changes in two steps. The cell converter 30X has single-phase converters on the input side and the output side and their DC units are connected back-to-back to each other. An energy storage element such as a capacitor C1 is connected to the DC unit. A voltage Vdcx is a voltage (referred to as a capacitor voltage) applied to the terminal of the capacitor C1.

The cell converter main body 303 shown in FIG. 3C includes a diode clamp type three-level converter configured such that the AC side potential changes in three steps. The DC unit has capacitors CP and CN. In the three-level converter, it is only necessary to perform a control process to keep a balance between the voltages of the two capacitors CP and CN. When simply the capacitor voltage is mentioned, the capacitor voltage is a total voltage (Vdcx) of the capacitors CP and CN.

Although an insulated-gate bipolar transistor (IGBT) is adopted for the switching elements of FIGS. 3B and 3C, other switching elements may be used. Examples of other switching elements include a metal-oxide-semiconductor field-effect transistor (MOSFET), a gate turn-off thyristor (GTO), a gate commutated turn-off thyristor (GCT), and the like. Also, when the body diode is not inherent in the switching element, a free-wheeling diode (FWD) may be used in antiparallel.

Assuming that there is a power flow during power running from the input side (the R, S, or T side) to the output side (the U, V, or W side), the single-phase converter on the input side performs forward conversion (conversion from the AC into the DC) and the single-phase converter on the output side performs reverse conversion (conversion from the DC into the AC). Consequently, the single-phase converter on the input side is referred to as a converter and the single-phase converter on the output side is referred to as an inverter.

For example, the cell converter main body 302 shown in FIG. 3B may be configured as a circuit unit in which the converter 3021 and the inverter 3022 are separated. In this case, the capacitor C1 may be separate from the converter 3021 and the inverter 3022 or may be accommodated in any circuit unit. Alternatively, the cell converter main body 302 may be configured by accommodating the converter 3021, the inverter 3022, and the capacitor C1 within one circuit unit.

The cell converter main body 303 shown in FIG. 3C may be configured as a circuit unit in which the converter 3031 and the inverter 3032 are separated. In this case, the capacitors CP and CN may be separate from the converter 3031 and the inverter 3032 or may be accommodated in any circuit unit. Alternatively, the cell converter main body 303 may be configured by accommodating the converter 3031, the inverter 3032, and the capacitors CP and CN in one circuit unit.

In the following description, the cell converter 30X can be made equivalent to a combination of the converter (3021 or 3031) and a DC power supply DC by regarding a combination of the above-described capacitor(s) (C1 or CP and CN) and the inverter (3032 or 3032) as a DC power supply DC such that the description is simplified.

The converter control unit 611 of the present embodiment generates a gate pulse of the converter (3021 or 3031) of the cell converter 30X in the following method.

A carrier signal of triangular waves (referred to as a triangular wave PWM carrier (a triangular wave carrier signal)) is used for PWM control of the converter (3021 or 3031). For example, the triangular wave PWM carrier is decided such that a first period when the amplitude increases at a prescribed rate of change and a second period when the amplitude decreases at a prescribed rate of change are included in one cycle and lengths of the first period and the second period are equal to each other.

A phase difference is provided such that the phases of the triangular wave PWM carriers in stages are not aligned.

Specifically, the basic triangular wave PWM carrier is shifted such that the phases of the triangular wave PWM carriers in the stages have a prescribed phase difference. In the case of the N-stage configuration, the phase difference is set to 180/N (deg/stage) and the phases of the triangular wave PWM carriers of the stages are decided in order. For example, the phase of the first-stage triangular wave PWM carrier is set to 0 in alignment with the phase of the basic triangular wave PWM carrier. The phase of the second-stage triangular wave PWM carrier is set to a phase obtained by adding 180/N (deg/stage) to the phase of the basic triangular wave PWM carrier. The phase of the third-stage triangular wave PWM carrier is set to a phase obtained by adding 180×2/N (deg/stage) to the phase of the basic triangular wave PWM carrier. Hereinafter, the phase of each stage is decided similarly.

The polarities of the reference voltage given to the input IN1 and the input IN2 of the cell converter 30X shown in FIG. 3A are inverted (referred to as single-phase unipolar modulation).

Also, the inverter control unit 621 may perform a control process in which a similar phase difference is provided using a triangular wave PWM carrier similar to the above-described triangular wave PWM carrier for the PWM control of the inverter (3022 or 3032). Alternatively, the inverter control unit 621 may apply another control method.

Figure 4:
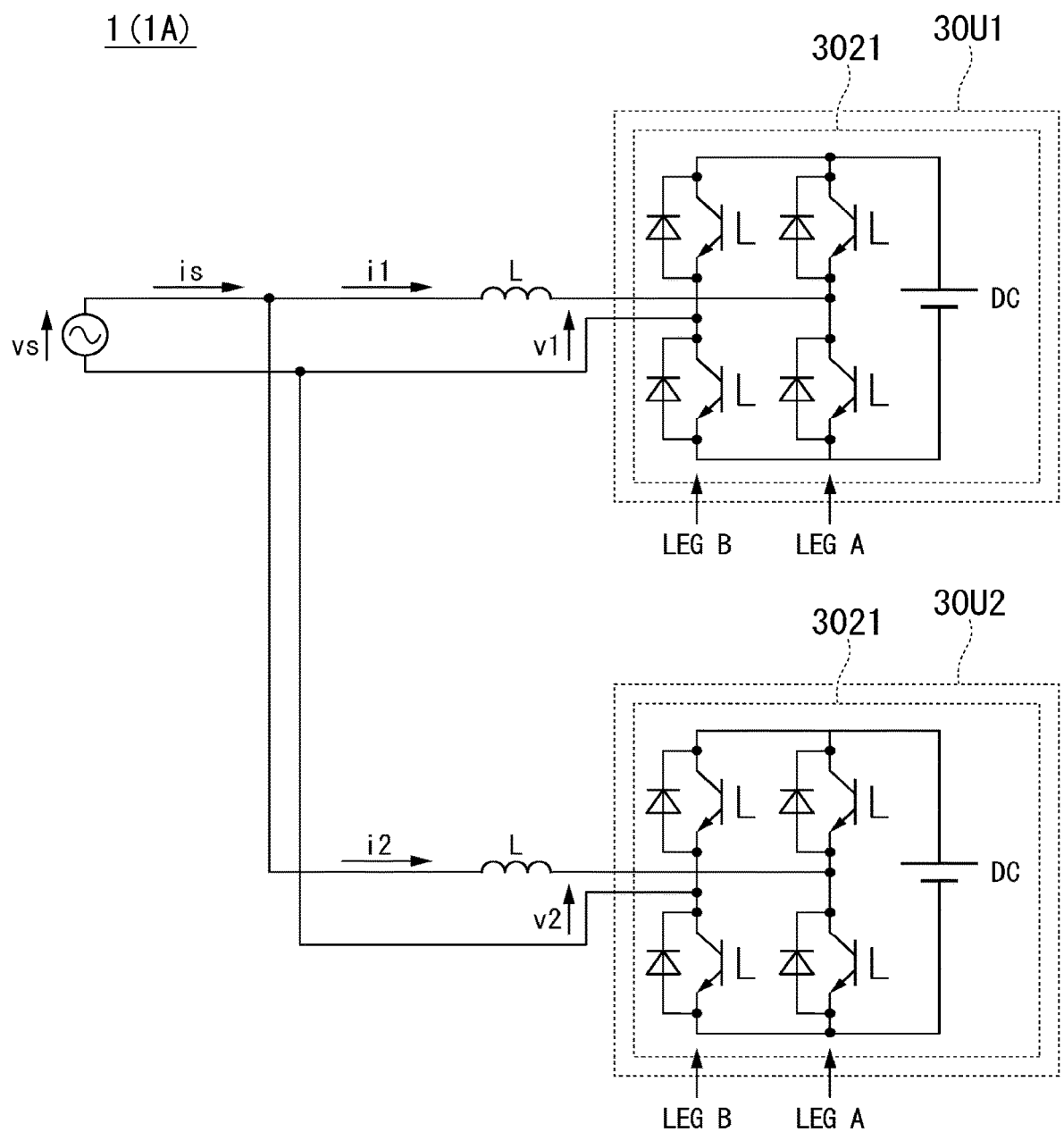
FIG. 4 is a configuration diagram of a simplified power conversion system according to a first embodiment.

Hereinafter, an example in which a two-level cell converter has a two-stage configuration such that the description is simplified will be described. FIG. 4 is a configuration diagram of a simplified power conversion system 1 of the embodiment. For example, it is assumed that the DC side of the equivalent circuit of the power conversion system 1 shown in FIG. 4 is an ideal power supply and the circuit type on the AC side is a single-phase circuit. Cell converters 30S1 and 30S2 correspond to the cell converters 30X.

Although an open star winding transformer is exemplified as the transformer 201, a case where it is replaced with an equivalent circuit configuration will be described. Voltage-current equations in the above-described circuit configuration have relationships shown in the following Eqs. (1) to (3).

[Math. 1]
$$is = i1 + i2 \quad (1)$$

[Math. 2]
$$vs = L \times d/dt(i1) + v1 \quad (2)$$

[Math. 3]
$$vs = L \times d/dt(i2) + v2 \quad (3)$$

In the above Eqs. (1) to (3), input voltages of the cell converter 30S1 and the cell converter 30S2 are represented by a voltage v1 and a voltage v2 and a system voltage of the AC power supply is represented by a voltage vs. Input currents of the cell converter 30S1 and the cell converter 30S2 are represented by a current i1 and a current i2 and a system current of the AC power supply is represented by a current is. L denotes equivalent reactance corresponding to the transformer 201 or the like.

The following Eq. (4) is obtained by carrying out an addition operation on both sides of the above Eqs. (2) and (3), applying Eq. (1) to an addition result, performing organization, and converting an organization result into an integral system.

[Math. 4]

$$is = \int ((2vs - (v1 + v2))/L)dt \quad (4)$$

The above Eq. (4) shows that the system current is can be controlled using a synthetic voltage (v1+v2) based on the input voltages of the cell converter 30S1 and the cell converter 30S2.

Timings of a current sampling operation and a reference voltage update operation will be described with reference to FIG. 5.

Figure 5:
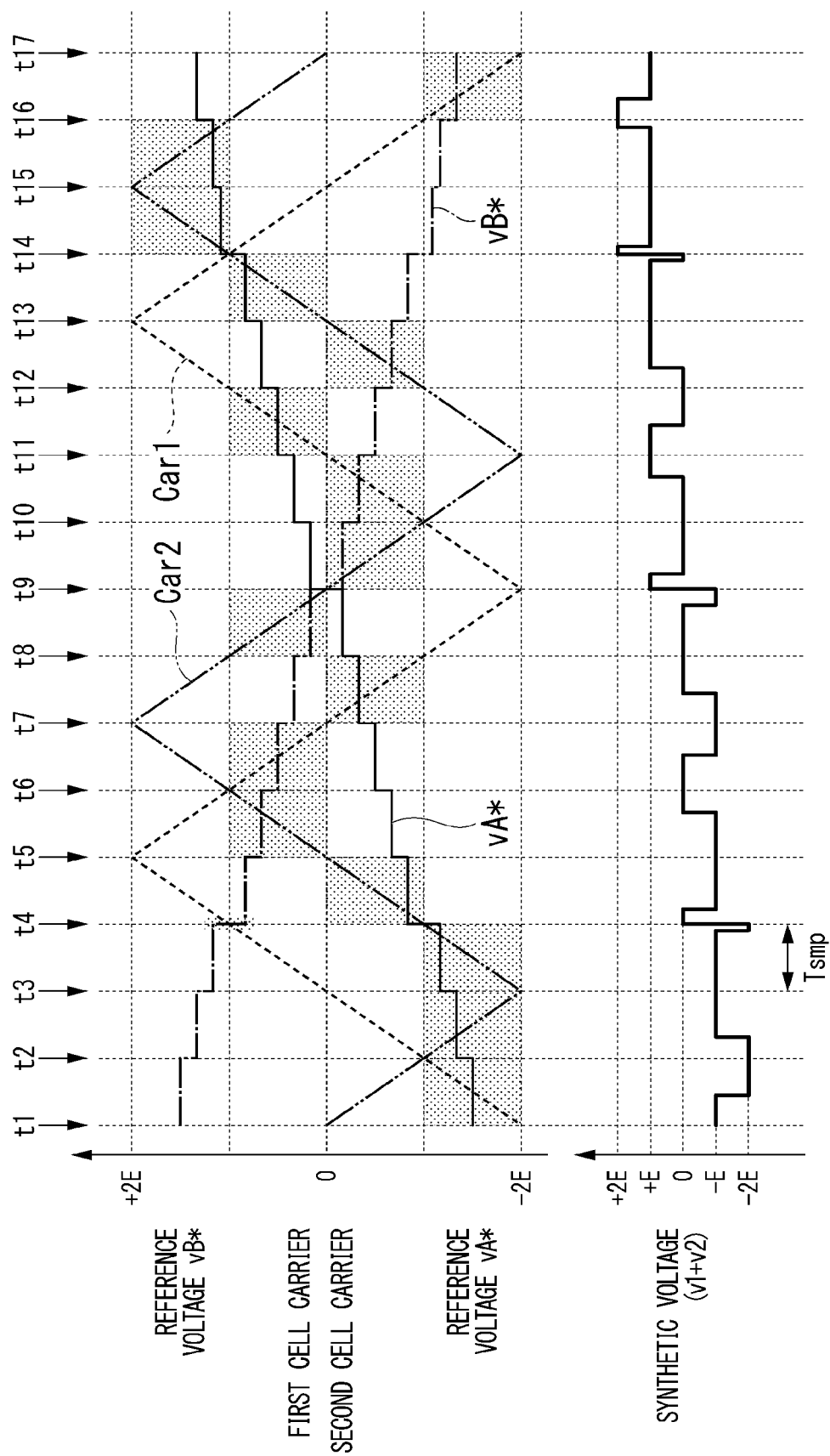
FIG. 5 is a diagram for describing timings of a current sampling operation and a reference voltage update operation according to the first embodiment.

FIG. 5 is a diagram for describing the timings of the current sampling operation and the reference voltage update operation according to the embodiment.

On the upper side of the timing chart shown in FIG. 5, two triangular wave PWM carriers (for example, referred to as a first cell carrier Car1 (a first carrier signal), a second cell carrier Car2 (a second carrier signal)) and changes in a reference voltage vA* of leg A and a reference voltage vB* of leg B are shown. For example, a difference between the reference voltage vA* and the reference voltage vB* corresponds to an input voltage v1. A change in the synthetic voltage (v1+v2) is shown on the lower side of the timing chart. Each of times t1 to t17 is decided during a prescribed cycle (Tsmp) and becomes timings of the current sampling operation and the reference voltage update operation.

As described above, the phase of a carrier (referred to as a cell carrier) of the cell converter 30X in each stage is shifted by about a quarter cycle. The phase of the second cell carrier Car2 in the example shown in FIG. 5 is delayed by about a quarter of one cycle of the triangular wave PWM carrier as compared with the phase of the first cell carrier Car1.

By giving reference voltages with opposite polarities on leg A and leg B as described above, the polarities of the reference voltages given to the input IN1 and the input IN2 of the converter are reversed. Here, an example in which the reference voltages in the cell converter 30S1 and the cell converter 30S2 are reference voltages whose polarities are opposite to each other with the same amplitude such that the description is simplified is given.

For example, timings of the current sampling operation and the reference voltage update operation in the cell converter 30S1 of the first stage may be decided on the basis of vertices of the first cell carrier Car1 and the second cell carrier Car2 and each intermediate point between the two vertices adjacent to each other in the time axis direction (hereinafter simply referred to as each intermediate point) among the vertices. The current sampling operation and the reference voltage update operation in the cell converter 30S2 of the second stage may be performed at the above-described timings. Also, the vertices of the cell carriers in the stages include one or both of a point of a positive peak value (extreme value) and a point of a negative peak value (extreme value). For example, it is only necessary to decide the above-described timings by associating adjacent points with positive peak values (extreme values) or adjacent points with negative peak values (extreme values).

For example, the timings of the vertices of the first cell carrier Car1 are t1, t5, t9, t13, and t17 in FIG. 5. The timings of the vertices of the second cell carrier Car2 are t3, t7, t11, and t15 in FIG. 5. The timings of the intermediate points are t2, t4, t6, t8, t10, t12, t14, and t16 in FIG. 5. In the case of this embodiment, timings from t1 to t17 become the timings of the current sampling operation and the reference voltage update operation in each cell converter 30X.

As described above, because the phase difference of the cell carriers in each stage is a quarter of one cycle of the triangular wave PWM carrier, the timings of the current sampling operation and the reference voltage update operation in the cell converter 30S 1 of the first stage are consistent with the timings of the current sampling operation and the reference voltage update operation in the cell converter 30S2 of the second stage. According to this, a configuration in which the current sampling operation and the reference voltage update operation are performed at vertices and intermediate points of cell carriers in the cell converter 30S1 and the cell converter 30S2 is adopted.

For example, it is possible to generate a synthetic voltage which is a voltage quantized to multiple values on the basis of magnitude relationships between magnitudes of the two triangular wave PWM carriers (the first cell carrier Car1 and the second cell carrier Car2), the reference voltage vA* of leg A, and the reference voltage vB* of leg B.

When the reference voltage vA* is lower than those of both the first cell carrier Car1 and the second cell carrier Car2 and the reference voltage vB* is higher than those of both the first cell carrier Car1 and the second cell carrier Car2, the converter control unit 611 controls the switching elements of the converters such that the synthetic voltage (v1+v2) becomes (−2E).

When the reference voltage vA* is lower than that of the first cell carrier Car1 and higher than that of the second cell carrier Car2 and the reference voltage vB* is higher than those of both the first cell carrier Car1 and the second cell carrier Car2, the converter control unit 611 controls the switching elements of the converters such that the synthetic voltage (v1+v2) becomes (−E).

When both the reference voltage vA* and the reference voltage vB* are higher than that of the second cell carrier Car2 and lower than that of the first cell carrier Car 1 or when both the reference voltage vA* and the reference voltage vB* are lower than those of both the first cell carrier Car1 and the second cell carrier Car2, the converter control unit 611 controls the switching elements of the converters such that the synthetic voltage (v1+v2) becomes (−0).

When the reference voltage vA* is higher than those of both the first cell carrier Car1 and the second cell carrier Car2 and the reference voltage vB* is lower than that of the first cell carrier Car1 and higher than that of the second cell carrier Car2 or when the reference voltage vB* is lower than those of both the first cell carrier Car1 and the second cell carrier Car2 and the reference voltage vA* is lower than that of the first cell carrier Car1 and higher than that of the second cell carrier Car2, the converter control unit 611 controls the switching elements of the converters such that the synthetic voltage (v1+v2) becomes (+E).

When the reference voltage vA* is higher than those of both the first cell carrier Car1 and the second cell carrier Car2 and the reference voltage vB* is lower than those of both the first cell carrier Car1 and the second cell carrier Car2, the converter control unit 611 controls the switching elements of the converters such that the synthetic voltage (v1+v2) becomes (+2E).

Here, attention is paid to a relationship between the reference voltage vA* and the synthetic voltage (v1+v2) of each section (referred to as a Tsmp section) partitioned by the cycle Tsmp. The magnitudes of the synthetic voltage (v1+v2) in Tsmp sections change discretely with the passage of time and have a plurality of values.

The converter control unit 611 controls each converter in the PWM method such that a time average value between instantaneous values of the synthetic voltage (v1+v2) in the Tsmp sections becomes equal to the reference voltage vA* in each Tsmp section. That is, when Eq. (4) is satisfied in each of the above Tsmp sections, the following Eq. (5) is also satisfied.

[Math. 5]

$$is = \int ((2vs - (v1 + v2))/L)dt = \int ((2vs - vA^*)/L)dt \quad (5)$$

Because the above Eq. (5) is satisfied in each Tsmp section, the two converters 3021 connected in parallel in FIG. 4 iterate the current sampling operation and the reference voltage update operation during the cycle Tsmp and therefore current controllability corresponding to a three-phase two-level inverter can be obtained.

According to the above-described control method, the converter control unit 611 updates the reference voltage a plurality of times within a half cycle of the triangular wave PWM carrier as shown in FIG. 5. Thereby, the reference voltage vA* and the triangular wave PWM carrier (the first cell carrier Car1) intersect a plurality of times within the half cycle of the triangular wave PWM carrier. In other words, there are four or more even-numbered timings related to the current sampling operation and the reference voltage update operation during one cycle of the triangular wave PWM carrier.

Also, in the case of the example shown in FIG. 5, because the result of comparison between the reference voltage and the triangular wave PWM carrier is shown as it is, a pulse having a relatively narrow width is included. When the present invention is applied to an actual device, it is possible to limit the occurrence of a pulse with a relatively narrow width (for example, a narrow pulse whose width is less than a specified width) in a method such as a method in which the switching element of the converter 3021 is not allowed to perform a switching process.

A result of simulation of the circuit configuration of FIG. 4 will be described with reference to FIG. 6.

Figure 6:
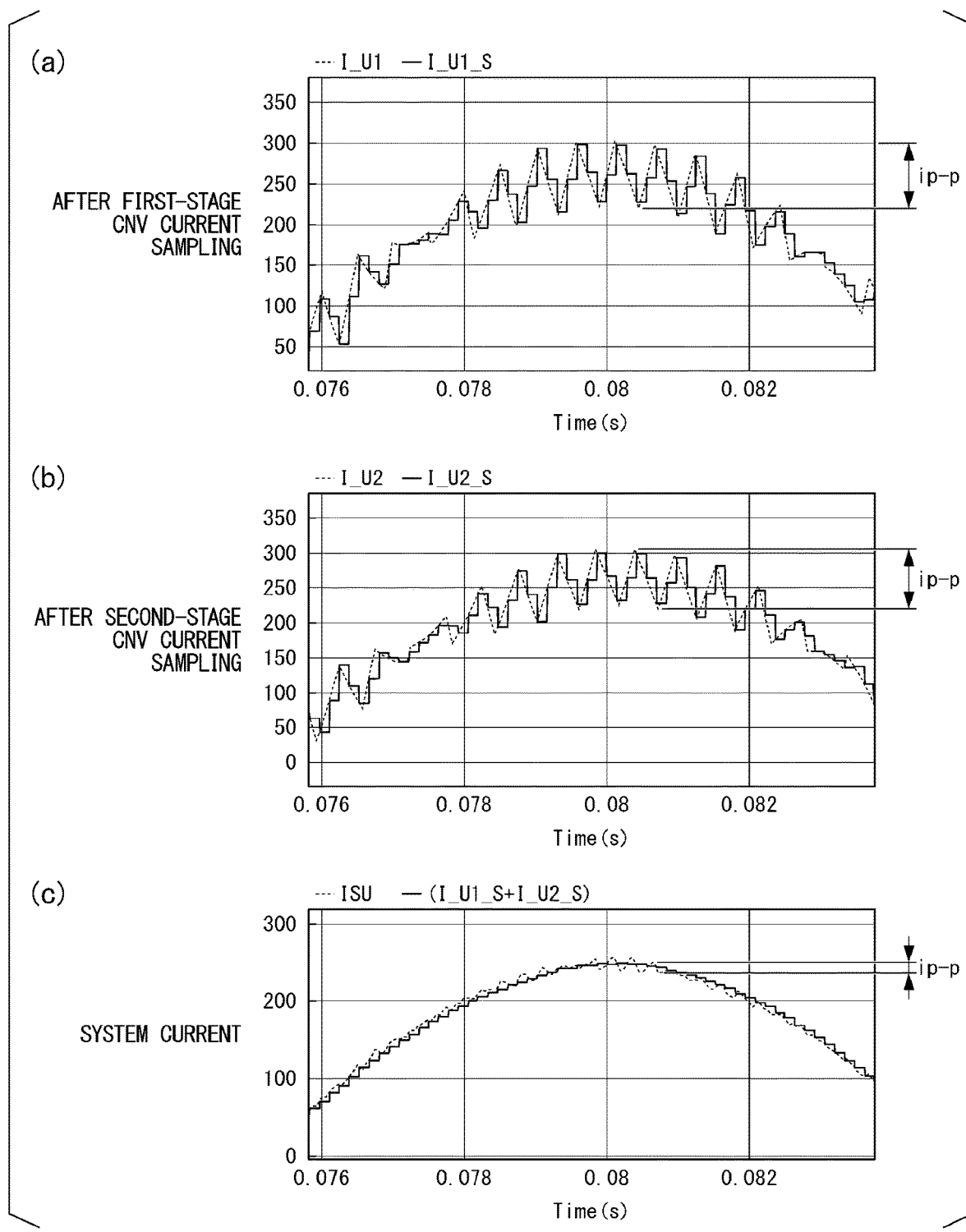
FIG. 6 is a diagram for describing a result of simulation of a circuit configuration of FIG. 4.

FIG. 6 is a diagram for describing the result of the simulation of the circuit configuration of FIG. 4. In (a) of FIG. 6, a sampling result (I_U1_S: solid line) of a detected value (I_U1: broken line) of a current (a CNV current) of the first-stage converter is shown. In (b) of FIG. 6, a sampling result (I_U2_S: solid line) of the detected value (I_U2: broken line) of a current (a CNV current) of the second-stage converter is shown. In (c) of FIG. 6, a change in the system current is shown. The amplitude of this system current is a sum of the sampling result (I_U1_S) of the current of the first-stage converter shown in (a) of FIG. 6 and the sampling result (I_U2_S) of the current of the second-stage converter shown in (b) of FIG. 6 described above. The switching ripple of the system current is shown in (c) of FIG. 6 is small as compared with a result of the current sampling operation in each converter.

The above Eq. (5) is satisfied in an N-stage circuit configuration when the current sampling operation and the reference voltage update operation are performed at vertices and intermediate points of cell carriers. In this case, a carrier frequency fcar of each stage and the cycle Tsmp have the relationship of the following Eq. (6). As shown in this relationship of Eq. (6), the cycle Tsmp is shortened as the number of stages N increases and therefore the control characteristics can be expected to be improved.

[Math. 6]

$$Tsmp = 1/4/fcar/N \quad (6)$$

Also, the circuit configuration in the case of N stages is equivalent to the circuit configuration in which N converters are connected in parallel on the secondary side of the transformer 201.

According to the embodiment, a plurality of cell converters 30X of the power conversion system 1 are provided in parallel for each phase of the AC power supply 101 (the power system). The converter control unit 611 (the control unit) controls the plurality of cell converters 30X according to carrier comparison type PWM control using a plurality of carrier signals having a prescribed phase difference from each other. The converter control unit 611 detects a current of a primary side of the plurality of cell converters 30X at each of four or more even-numbered timings when the four or more even-numbered timings are defined at a cycle Tsmp (prescribed time intervals) during one cycle of a specific carrier signal among the plurality of carrier signals. The converter control unit 611 generates a reference voltage for the PWM control using a value ix of the detected current of the primary side and a value of a reference current of the primary side and updates the reference voltage at each of the four or more even-numbered timings. The converter control unit 611 controls a specific cell converter among the plurality of cell converters 30X using the specific carrier signal and the updated reference voltage. Thereby, the power conversion system 1 can further improve the control responsiveness of the current control on the AC power supply 101 side.

Modified Examples of First Embodiment

Modified examples of the first embodiment will be described.

In the first embodiment, an example in which a current sampling operation and a reference voltage update operation are iterated at vertices and intermediate points of cell carriers has been described. Instead, in the present modified example, an example in which intermediate points of cell carriers are excluded from the timings related to control with respect to the example of the first embodiment and the current sampling operation and the reference voltage update operation are iterated at vertices of the cell carriers will be described.

Figure 7:
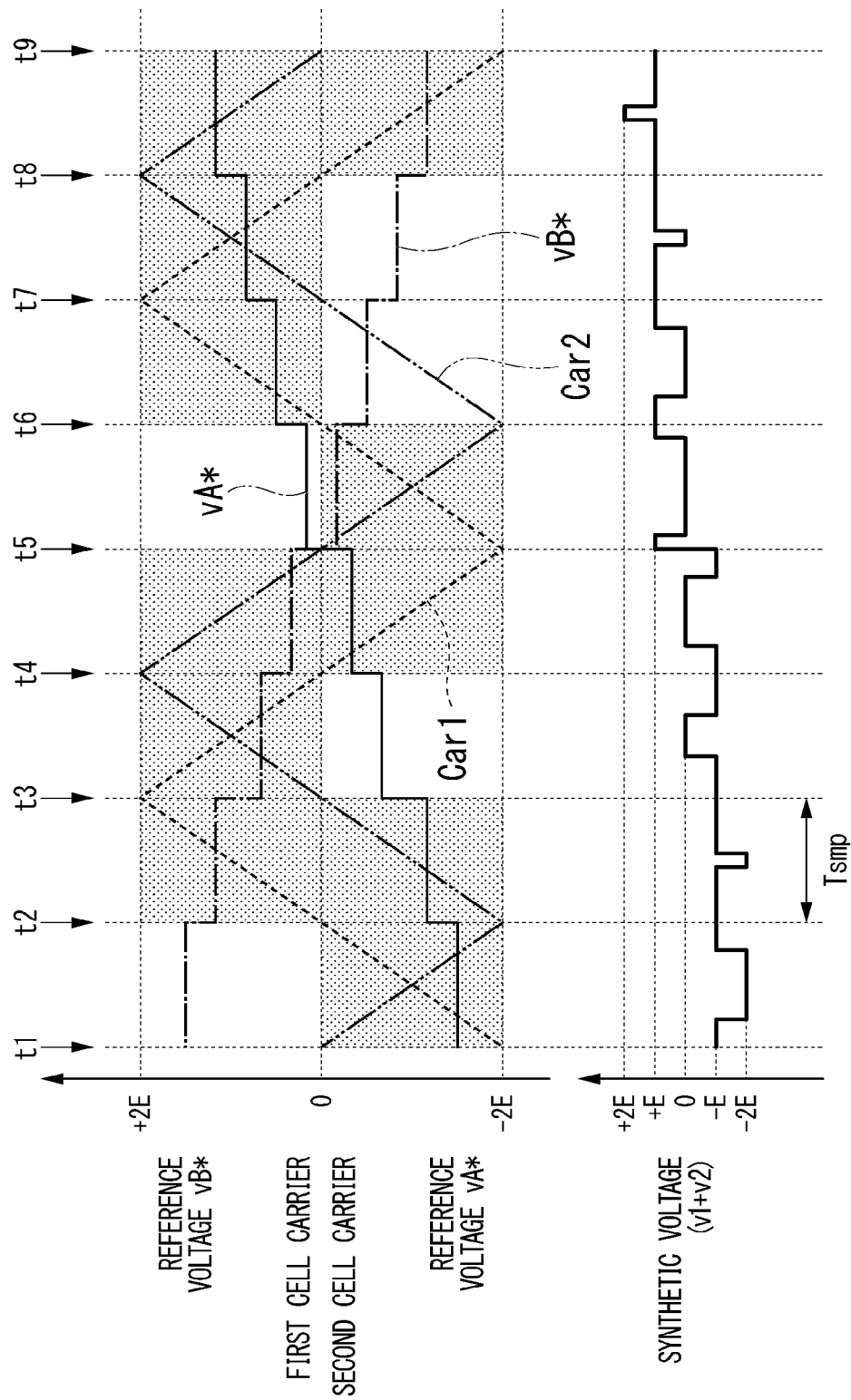
FIG. 7 is a diagram for describing timings of a current sampling operation and a reference voltage update operation according to a modified example of the first embodiment.

FIG. 7 is a diagram for describing timings of the current sampling operation and the reference voltage update operation according to the modified example of the first embodiment.

Also, it can be seen that the above-described circuit of FIG. 4 has a path (referred to as a circulation current path) in which the current can be circulated inside of the power converter 30 without affecting the system current is. When this is mathematically expressed, a difference between Eq. (2) and Eq. (3) is taken and converted into an integral system to obtain the following Eq. (7).

[Math. 7]

$$i1 - i2 = \int (-(v1 - v2)/L) dt \qquad (7)$$

The above Eq. (7) shows that a circulation current (i1−i2) can be controlled by a difference voltage (v1−v2) of each converter within the power converter 30.

According to the above, it is possible to perform a control process as in the first embodiment by performing the current sampling operation and the reference voltage update operation at timings of vertices of cell carriers even if the current sampling operation and the reference voltage update operation are not performed at timings of both types of points such as vertices and intermediate points of the cell carriers. Also, in the case of the present modified example, the cycle Tsmp can be made relatively long as compared with that of the example of the first embodiment. Although the responsiveness of the current control may deteriorate when the cycle Tsmp is lengthened, a concentration degree (a density) of an arithmetic process within each cycle Tsmp can be reduced.

Also, the timings of the vertices of the cell carriers can be changed to the timings of the intermediate points of the cell carriers. Thereby, a current sampling operation is performed at the timings of the vertices or the intermediate points of the cell carriers according to this modified example and therefore it is possible to reduce the switching ripple of the system current is as compared with a result of current sampling in the converter of each stage.

When the first embodiment is compared with its modified example, it is possible to improve the responsiveness as compared with the method of the modified example of the first embodiment by applying the method of the first embodiment with respect to the system current is. Even if the length of the cycle Tsmp is adjusted to change a density of timings of current sampling, the system current is can be stably controlled by the converter.

On the other hand, a relationship similar to that of the system current is is not established with respect to the control of the circulation current. Thus, it is necessary to lower the control gain related to the control of the circulation current. As shown in the above Eqs. (5) and (7), it is possible to decide the control gain with respect to the system current is and the circulation current independently of each other. For example, it is possible to make an adjustment such that the control gain for controlling the circulation current is low while maintaining the control gain for controlling the system current is.

Second Embodiment

A second embodiment will be described.

In the second embodiment, an example in which the number of parallel converters is extended to N will be described in relation to the method shown in the first embodiment. A system current is becomes a sum of N currents corresponding to the number of parallel converters. Because each converter is controlled individually, the current value of each converter is not uniform. To reduce an influence of a variation in a current in each converter, it is only necessary to calculate an average of N currents and control the system current is on the basis of the average such that a weight of a current value in each converter is adjusted. Also, the remaining (N−1) components correspond to circulation current components. Although various methods can be considered for allocating the circulation current components, an example is shown in the following Eqs. (8) to (13).

In Eqs. (8) to (13) shown below, for example, a current component corresponding to the AC side of each converter is denoted by an. For example, n is an identification number of each converter. Because the phase of the system current is is electrically equal to a zero phase (zero), the system current is is denoted by z that is the first letter of the word "zero." Circulation currents are denoted by $c_1, \ldots, c_{n-1}$ using the first letter of the word "circulate." The transformation of the current component $a_n$ corresponding to each converter into the system current z and the circulation currents $c_1, \ldots, c_{n-1}$ is referred to as zc transformation. The inverse transformation associated with the zc transformation is referred to as inverse zc transformation. For example, each current component denoted by $a_n$ is a current before the zc transformation. Each current component denoted by z and $c_1, \ldots, c_{n-1}$ is a current after the zc transformation.

For example, Eqs. (8) and (9) are examples of transformation equations when the number of parallel converters is two (N=2). Eq. (8) is an arithmetic equation for the zc transformation and Eq. (9) is an arithmetic equation for the inverse zc transformation.

[Math. 8]

$$\begin{bmatrix} z \\ c_1 \end{bmatrix} = \begin{bmatrix} \frac{1}{2} & \frac{1}{2} \\ 1 & -1 \end{bmatrix} \begin{bmatrix} a_1 \\ a_2 \end{bmatrix} \qquad (8)$$

[Math. 9]

$$\begin{bmatrix} a_1 \\ a_2 \end{bmatrix} = \begin{bmatrix} 1 & \frac{1}{2} \\ 1 & -\frac{1}{2} \end{bmatrix} \begin{bmatrix} z \\ c_1 \end{bmatrix} \qquad (9)$$

Eqs. (10) and (11) are examples of transformation equations when the number of parallel converters is 3 (N=3). Eq. (10) is an arithmetic equation for the zc transformation and Eq. (11) is an arithmetic equation for the inverse zc transformation.

[Math. 10]

$$\begin{bmatrix} z \\ c_1 \\ c_2 \end{bmatrix} = \begin{bmatrix} \frac{1}{3} & \frac{1}{3} & \frac{1}{3} \\ 1 & -\frac{1}{2} & -\frac{1}{2} \\ 0 & 1 & -1 \end{bmatrix} \begin{bmatrix} a_1 \\ a_2 \\ a_3 \end{bmatrix} \qquad (10)$$

[Math. 11]

$$\begin{bmatrix} a_1 \\ a_2 \\ a_3 \end{bmatrix} = \begin{bmatrix} 1 & \frac{2}{3} & 0 \\ 1 & -\frac{1}{3} & \frac{1}{2} \\ 1 & -\frac{1}{3} & -\frac{1}{2} \end{bmatrix} \begin{bmatrix} z \\ c_1 \\ c_2 \end{bmatrix} \qquad (11)$$

Eqs. (12) and (13) are examples of transformation equations when the number of parallel converters is 5 (N=5). Eq.

(12) is an arithmetic equation for the zc transformation and Eq. (13) is an arithmetic equation for the inverse zc transformation.

[Math. 12]

$$\begin{bmatrix} z \\ c_1 \\ c_2 \\ c_3 \\ c_4 \end{bmatrix} = \begin{bmatrix} \frac{1}{5} & \frac{1}{5} & \frac{1}{5} & \frac{1}{5} & \frac{1}{5} \\ 1 & -\frac{1}{4} & -\frac{1}{4} & -\frac{1}{4} & -\frac{1}{4} \\ 0 & 1 & -\frac{1}{3} & -\frac{1}{3} & -\frac{1}{3} \\ 0 & 0 & 1 & -\frac{1}{2} & -\frac{1}{2} \\ 0 & 0 & 0 & 1 & -1 \end{bmatrix} \begin{bmatrix} a_1 \\ a_2 \\ a_3 \\ a_4 \\ a_5 \end{bmatrix} \quad (12)$$

[Math. 13]

$$\begin{bmatrix} a_1 \\ a_2 \\ a_3 \\ a_4 \\ a_5 \end{bmatrix} = \begin{bmatrix} 1 & \frac{4}{5} & 0 & 0 & 0 \\ 1 & -\frac{1}{5} & \frac{3}{4} & 0 & 0 \\ 1 & -\frac{1}{5} & -\frac{1}{4} & \frac{2}{3} & 0 \\ 1 & -\frac{1}{5} & -\frac{1}{4} & -\frac{1}{3} & \frac{1}{2} \\ 1 & -\frac{1}{5} & -\frac{1}{4} & -\frac{1}{3} & -\frac{1}{2} \end{bmatrix} \begin{bmatrix} z \\ c_1 \\ c_2 \\ c_3 \\ c_4 \end{bmatrix} \quad (13)$$

By using the above-described zc transformation, the current component after zc transformation can be divided into components of the system current z and the circulation currents $c_1, \ldots, c_{n-1}$. By adjusting each of the components of the system current z and the circulation currents $c_1, \ldots, c_{n-1}$ after the zc transformation and controlling each of the N parallel converters on the basis of an adjustment result, current control for the N parallel converters is possible.

Figure 8:
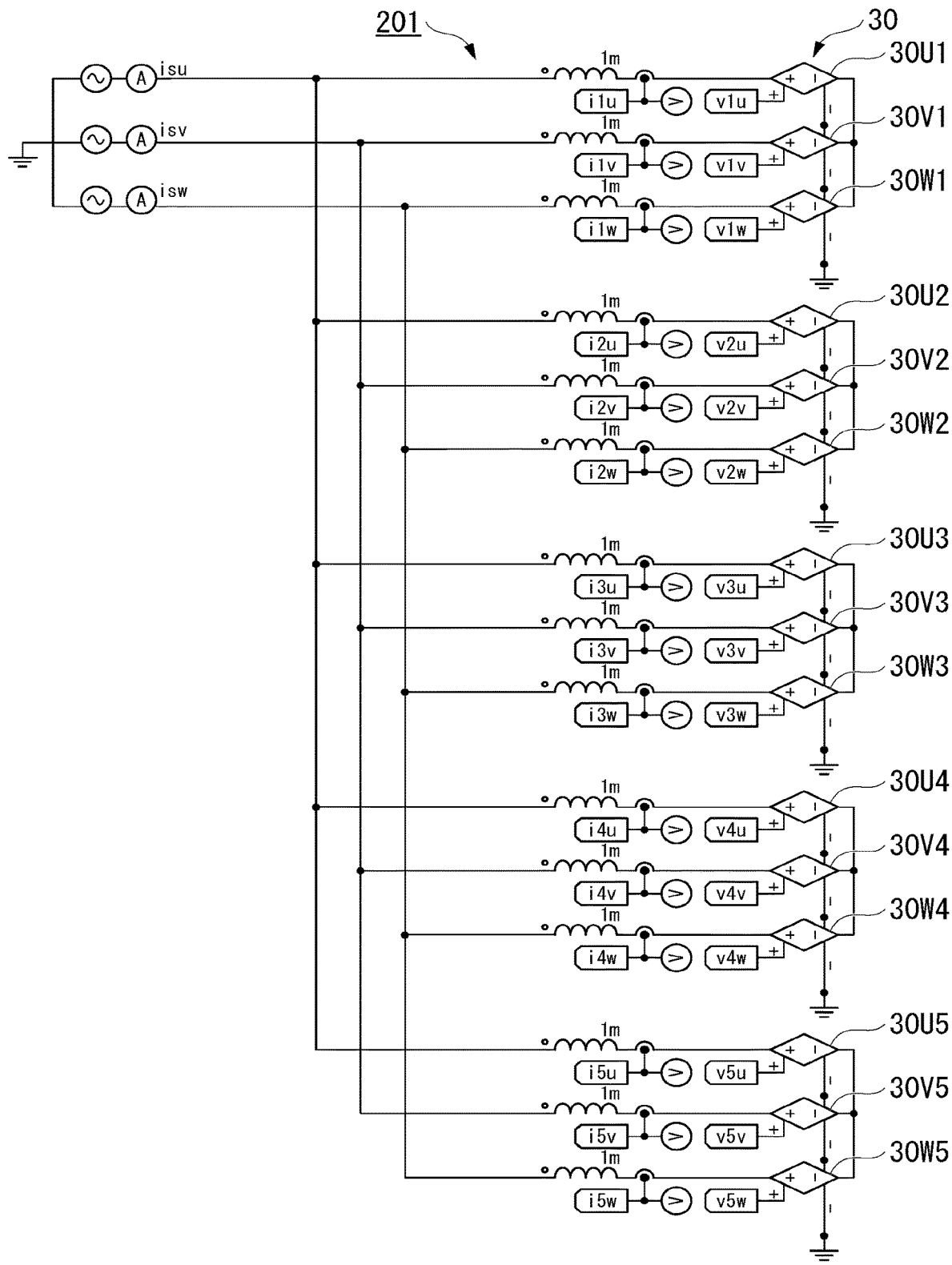
FIG. 8 is a configuration diagram of a model of a power conversion system in which five converters are arranged in parallel according to a second embodiment.

More specifically, an example of a current control system when the number of parallel converters is 5 (N=5) will be described with reference to FIGS. 8 and 9. FIG. 8 is a configuration diagram of a model of a power conversion system in which five converters are arranged in parallel according to the second embodiment.

The power converter 30 includes cell converters 30U1 to 30U5, cell converters 30V1 to 30V5, and cell converters 30W1 to 30W5.

Figure 9:
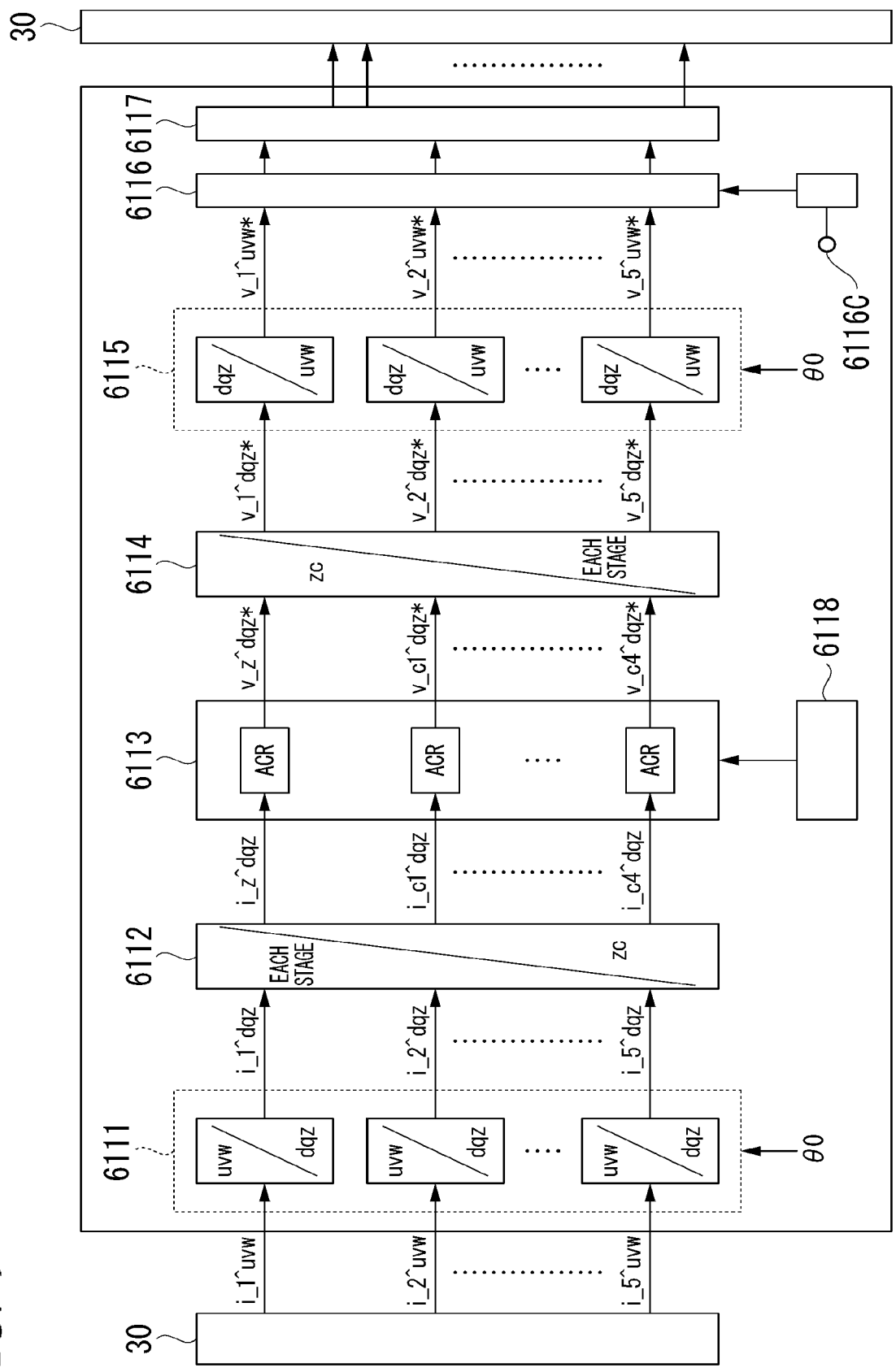
FIG. 9 is a configuration diagram of a converter control unit according to the second embodiment.

FIG. 9 is a configuration diagram of a converter control unit 611 according to the second embodiment. In FIG. 9, the converter control unit 611 and the power converter 30 related thereto are shown.

The power converter 30 outputs each of values of currents (current values) detected by the converters in the stages. i_1^uvw denotes a current value of a first-stage converter. The current value of the first-stage converter is a value indicating a magnitude of a current detected by a current sensor 301 in the first-stage converter. Hereinafter, the same is true. A character string following "_" (underline) is a subscript character string and a character string following "^" (hat) is a superscript character string. i_2^uvw denotes a current value of a second-stage converter. Likewise, i_5^uvw denotes a current value of a fifth-stage converter. For example, the current values (i1u, i1v, and i1w (FIG. 8)) detected by the cell converters 30U1, 30V1, and 30W1 described above are collectively denoted by i_1^uvw. The same is also true for i_2^uvw to i_5^uvw. Also, v1u to v5u in FIG. 8 denote the input voltages of the U-phase cell converters 30U1 to 30U5.

The converter control unit 611 includes, for example, a dq0 transformation unit 6111, a ZC transformation unit 6112, a current control unit 6113, an inverse ZC transformation unit 6114, an inverse dq0 transformation unit 6115, a PWM control unit 6116, a gate pulse generation unit 6117, and a reference current generation unit 6118.

The dq0 transformation unit 6111 performs general dq0 transformation on the basis of the current value of the converter in each stage using each reference phase θ0. The dq0 transformation is coordinate transformation for transforming a component of a stationary coordinate system into a component of a dq0 coordinate system, which is a rotating coordinate system for rotation in accordance with the reference phase θ0. For example, i_1^dqz denotes a current vector after dq0 transformation of the first-stage converter. i_2^dqz denotes a current vector after dq0 transformation of the second-stage converter. Likewise, i_5^dqz denotes a current vector after dq0 transformation of the fifth-stage converter. i_1 ^dqz to i_5^dqz denote vectors of current components in the dq0 coordinate system.

The ZC transformation unit 6112 performs zc transformation on the current component in the dq0 coordinate system after the dq0 transformation. For example, i_z^dqz denotes a current vector of the system current z after the zc transformation. i_c1^dqz to i_c4^dqz denote current vectors of the circulation current after the zc transformation.

The reference current generation unit 6118 generates a reference current on the basis of a magnitude of a DC voltage of each stage. A general method may be applied to generate this reference current.

The current control unit 6113 (ACR written in FIG. 9) generates a reference voltage by performing current control based on a reference current generated by the reference current generation unit 6118 and decided in association with a control cycle and the current vectors after the zc transformation. The current vectors after the zc transformation include the above-described i_z^dqz and i_c1^dqz to i_c4^dqz as elements. For example, v_z^dqz* denotes a reference voltage corresponding to the system current z after the zc transformation. v_c1^dqz* to v_c4^dqz* denote reference voltages corresponding to the circulation current after the inverse zc transformation.

As described above, it is only necessary for the current control unit 6113 to perform current control including an arithmetic operation using a current vector including a magnitude of one system current is and magnitudes of (N−1) circulation currents as elements and an $N^{th}$-order square matrix. The current control unit 6113 may also perform current control including an arithmetic operation using a current vector including one system current is and (N−1) circulation currents as elements and an $N^{th}$-order square matrix. It is only necessary for the current control unit 6113 to generate a voltage vector including the synthetic voltage (v_z^dqz*) on the AC power supply 101 side and the (N−1) reference voltages corresponding to the (N−1) circulation currents as elements according to this arithmetic operation and perform current control including this arithmetic operation.

The inverse ZC transformation unit 6114 performs inverse zc transformation with respect to the reference voltage generated by the current control unit 6113 and generates a reference voltage of the dq0 coordinate system in association with each stage. v_1^dqz* to v_5^dqz* denote reference voltages of the stages after the inverse zc transformation.

The inverse dq0 transformation unit 6115 performs inverse dq0 transformation with respect to the reference voltage in each stage of the dq0 coordinate system generated by the inverse ZC transformation unit 6114 and generates the reference voltage in each stage of the uvw coordinate system. v_1^uvw* to v_5^uvw* denote reference voltages in the stages of each phase after the inverse dq0 transformation.

The PWM control unit 6116 includes a carrier generation unit 6116c. A gate signal for controlling each switch of the power converter 30 is generated on the basis of the triangular carrier generated by the carrier generation unit 6116c and the reference voltage of each stage generated by the inverse dq0 transformation unit 6115 and a gate pulse based on the gate signal is supplied to each switch of the power converter 30 via the pulse generation unit 6117. Thereby, a conductive state of each switch of the power converter 30 is controlled.

The above-described series of transformations will be described with reference to the following Eqs. (14) to (17). The expansion from Eq. (14) to Eq. (17) corresponds to a process until the reference voltage of the dq0 format of each parallel converter is obtained from a current of each parallel converter after the dq0 transformation. Because there is no mathematical difference between components of a d-axis, a q-axis, and a 0-axis in the dq0-axis coordinate system, the d-axis component will be exemplified and described as a representative thereof. Also, a case where the number of parallel converters N is set to 2 such that the description is simplified will be described.

A reference current vector I^d*, a current FBK vector I^d, and a reference voltage vector V^d* of each parallel converter with respect to the d-axis component are defined by Eq. (14).

[Math. 14]

$$I^{d*} = \begin{bmatrix} i_1^{d*} \\ i_2^{d*} \end{bmatrix}, I^d = \begin{bmatrix} i_1^d \\ i_2^d \end{bmatrix}, V^{d*} = \begin{bmatrix} v_1^{d*} \\ v_2^{d*} \end{bmatrix} \quad (14)$$

A zc transformation matrix is denoted by M_zc and an inverse zc transformation matrix is denoted by M_zc^(−1). Assuming that the current control is only proportional control, a current control gain matrix M_ACR is defined by the following Eq. (15).

[Math. 15]

$$M_{ACR} = \begin{bmatrix} K_Z & 0 \\ 0 & K_{c1} \end{bmatrix} \quad (15)$$

In the above Eq. (15), K_z denotes a current control gain for the system current is and K_c1 denotes a current control gain for the circulation current.

The calculation of the reference voltage vector V^d* in FIG. 9 is shown in the following Eq. (16) using the above-described definition.

[Math. 16]

$$V^{d*} = M_{zc}^{-1} V_{zc}^{d*} \quad (16)$$

$$= M_{zc}^{-1} M_{ACR} (I_{zc}^{d*} - i_{zc}^d)$$

$$= M_{zc}^{-1} M_{ACR} M_{zc} (I^{d*} - I^d)$$

It can be seen that, when the above Eq. (16) is replaced using the following Eq. (17), this is equivalent to a process of calculating the reference voltage vector V^d* by controlling the current difference (I^(d*)−I^d) in the parallel converter format.

[Math. 17]

$$M' = M_{zc}^{-1} M_{ACR} M_{zc} \quad (17)$$

According to the present embodiment, the components of the system current z and the circulation currents $c_1, \ldots, c_{n-1}$ are easily adjusted by adjusting components of the system current z and the circulation current $c_1, \ldots, c_{n-1}$ using the matrix M_ACR after the zc transformation according to the zc transformation.

By calculating a transformation matrix M' using Eq. (17) in advance, the transformation matrix M' can be used for the calculation and the calculation load for each control cycle can be reduced.

Third Embodiment

A third embodiment will be described.

In the third embodiment, an example in which the above-described method is applied to three parallel converters will be described. The configuration in this case corresponds to the configuration of FIG. 1.

Figure 10:
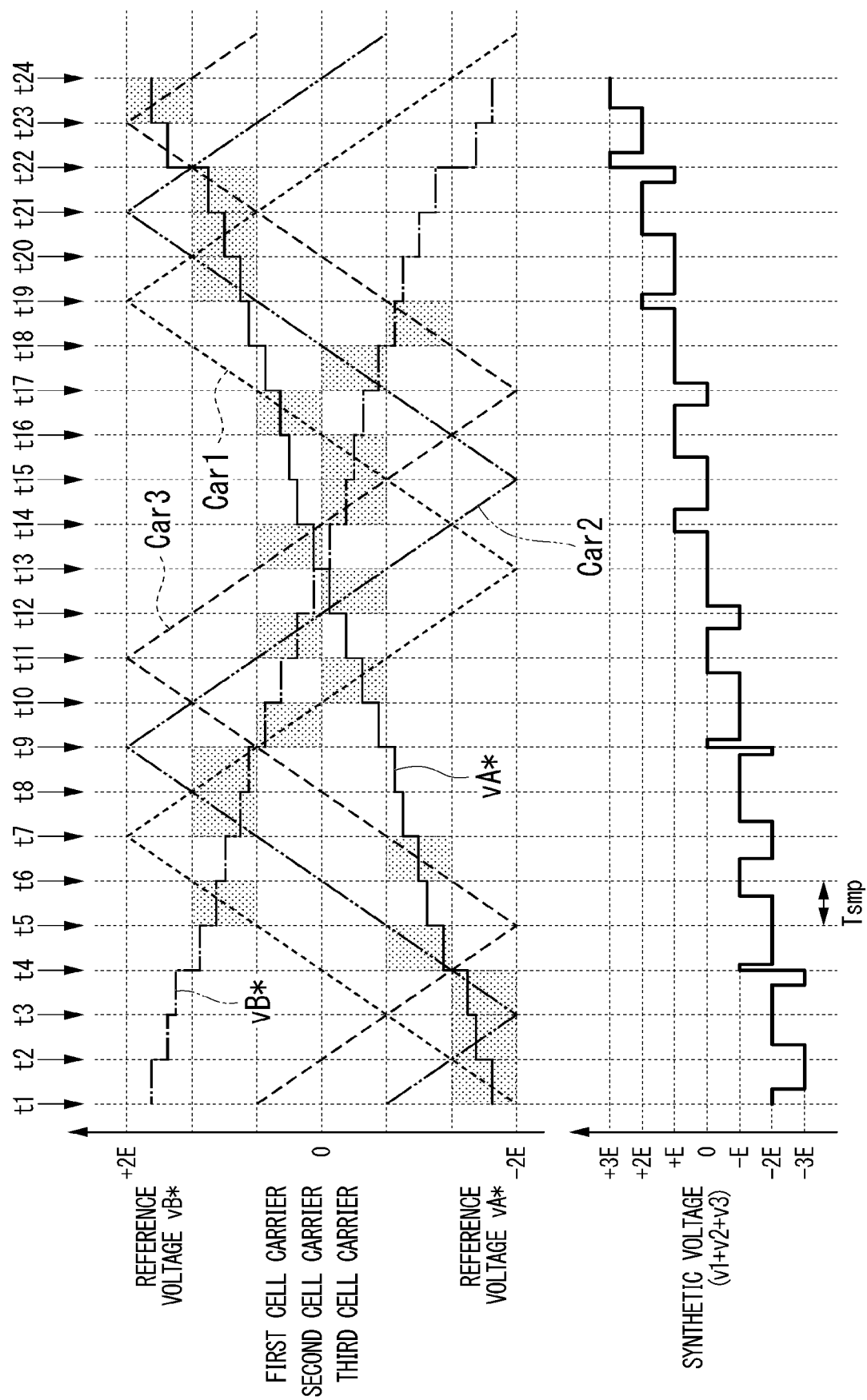
FIG. 10 is a diagram for describing timings of a current sampling operation and a reference voltage update operation according to the third embodiment.

Timings of a current sampling operation and a reference voltage update operation according to the third embodiment will be described with reference to FIG. 10. FIG. 10 is a diagram for describing the timings of the current sampling operation and the reference voltage update operation according to the third embodiment.

A difference from FIG. 5 described above is that the number of carriers has changed from 2 to 3 because the number of parallel converters has changed from 2 to 3. Thereby, the number of third cell carriers Car3 having a prescribed phase lag from the second cell carrier Car2 increases. Phase differences between cell carriers are evenly spaced as described above. In the case of this example, the number of timings of the current sampling operation and the reference voltage update operation is eight with respect to one cycle of the cell carrier. Because the number of parallel converters is 3, a synthetic voltage (v1+v2+v3) has a total of seven steps of −3E, −2E, −E, 0, +E, +2E, and +3E.

According to the present embodiment, the above-described desired synthetic voltage can be generated even if the number of parallel converters is three. By increasing the number of parallel converters in this way, the step of changing the value of the quantized synthetic voltage contributes to reducing the ripple noise because a ratio with respect to the total amplitude is reduced.

Fourth Embodiment

A fourth embodiment will be described.

In the fourth embodiment, an example in which the above-described method is applied to something other than a drive system for driving the motor 401 will be described.

First Application Example

The configuration example shown in FIG. 4 above described can be applied to a static synchronous compensator (STATCOM). Although this is not an equivalent circuit, a schematic configuration of the main circuit of the power conversion system 1A is provided. In the case of the STATCOM, a plurality of cell converters 30X are allowed to function as self-excited inverters. In other words, a configuration in which the inverter circuit of the cell converter 30X is excluded may be adopted.

The definition of the configuration is changed as described above. Further, switching processes between operation modes of a capacitor's operation, a no-load operation, and a reactor's operation may be implemented by compensating for the ineffective power in the power conversion system 1A including the STATCOM. For example, it is only necessary for the control unit of the above-described inverter (corresponding to the above-described converter control unit 611) to compensate for the ineffective power of an AC power supply (a power system) 101 by adjusting the circulation current flowing within the plurality of cell converters 30X and switching the above-described operation mode.

Second Application Example

Further, a battery may be connected to a DC side thereof to configure the power conversion system 1A as a battery power storage device. In this case, it is possible to charge the battery with DC power into which AC power is converted or supply the AC power into which the DC power stored in the battery is converted when the battery is discharged.

According to the above-described embodiment, a similar control method can be applied to a system other than the drive system.

According to the above-described at least one embodiment, a power conversion system is interconnected to a multi-phase AC power system. The power conversion system includes a plurality of converter main bodies and a control unit. The plurality of converter main bodies are provided in parallel for each phase of the power system. The control unit controls the plurality of converter main bodies according to carrier comparison type PWM control using a plurality of carrier signals having a prescribed phase difference from each other. The control unit detects a current of a primary side of the plurality of converter main bodies at each of four or more even-numbered timings when the four or more even-numbered timings are defined at prescribed time intervals during one cycle of a specific carrier signal among the plurality of carrier signals. The control unit generates a reference voltage for the PWM control using a value of the detected current of the primary side and a value of a reference current of the primary side and updates the reference voltage at each of the four or more even-numbered timings. The control unit controls a specific converter main body among the plurality of converter main bodies using the specific carrier signal and the updated reference voltage. Thereby, the power conversion system can further enhance the control responsiveness of current control on a power system side.

Also, the above-described control unit 601 (a computer) includes, for example, a storage unit, a central processing unit (CPU), a drive unit, and an acquisition unit. The storage unit, the CPU, the drive unit, and the acquisition unit are connected within the control unit via, for example, a bus. The storage unit includes a semiconductor memory. The CPU includes a processor that executes a desired process according to a software program. The drive unit generates a control signal for each part of the power conversion system 1 according to the control of the CPU. The acquisition unit acquires detection results of a current sensor and a voltage sensor. For example, the CPU of the control unit 601 controls the main circuit of each phase using the drive unit on the basis of the detection results of the current sensor and the voltage sensor acquired by the acquisition unit. The control unit 601 may implement a part or all of the process according to a process of the software program as described above or may implement a part or all of the process by hardware instead thereof. Also, a configuration in which the control unit 601 is appropriately divided may be adopted and the insulation of the circuit may be ensured by the configuration.

While several embodiments of the present invention have been described, these embodiments have been presented by way of example only, and are not intended to limit the scope of the inventions. These embodiments may be embodied in a variety of other forms. Various omissions, substitutions, and combinations may be made without departing from the spirit of the inventions. The inventions described in the accompanying claims and their equivalents are intended to cover such embodiments or modifications as would fall within the scope and spirit of the inventions.

REFERENCE SIGNS LIST

1 Power conversion system
201 Transformer
30 Power converter
30S, 30U, 30V, 30W, 30X Cell converter
302, 3021, 3031 Converter
303, 3022, 3032 Inverter
C1, CP, CN Capacitor
401 Motor
101 Power system
601 Control unit
611 Converter control unit
621 Inverter control unit
201 Transformer
6111 dq0 transformation unit
6112 ZC transformation unit
6113 Current control unit
6114 Inverse ZC transformation unit
6115 Inverse dq0 transformation unit
6116 PWM control unit
6117 Gate pulse generation unit
6118 Reference current generation unit

The invention claimed is:

1. A power conversion system interconnected to a multi-phase alternating current (AC) power system, the power conversion system comprising:
a plurality of converters including a plurality of switches and provided in parallel for each phase of the power system; and
a control unit configured to control the plurality of converters according to carrier comparison type pulse width modulation (PWM) control using a plurality of carrier signals having a prescribed phase difference from each other,
wherein the control unit detects a current of a primary side of the plurality of converters at each of four or more even-numbered timings when the four or more even-numbered timings are defined at prescribed time intervals during one cycle of a specific carrier signal among the plurality of carrier signals,
wherein the control unit generates a reference voltage for the PWM control using a value of the detected current of the primary side and a value of a reference current of the primary side and updates the reference voltage at each of the four or more even-numbered timings, and wherein the control unit controls a specific converter among the plurality of converters using the specific carrier signal and the updated reference voltage.

2. The power conversion system according to claim 1, wherein the four or more even-numbered timings include a first timing related to a timing when an amplitude of any one of the plurality of carrier signals has a peak value.

3. The power conversion system according to claim 1, wherein the four or more even-numbered timings include a second timing related to a timing between first timings when amplitudes of the plurality of carrier signals have peak values.

4. The power conversion system according to claim 3, wherein the second timing is decided between two timings when the amplitudes of the plurality of carrier signals have the peak values adjacent to each other in a time axis direction on a time axis.

5. The power conversion system according to claim 3, wherein the second timing is decided between a first peak timing when a preceding first carrier signal among the plurality of carrier signals has a peak value and a second peak timing when a second carrier signal subsequent to the first carrier signal has a peak value.

6. The power conversion system according to claim 1, wherein the number of even-numbered timings, which is four or more, is decided on the basis of the number of converters provided in parallel for each phase.

7. The power conversion system according to claim 1, wherein the number of converters provided in parallel for each phase is N (N is an integer greater than or equal to 2), and
wherein the control unit performs a decision process according to current control including an arithmetic operation using a current vector including a magnitude of a system current flowing through the power system and magnitudes of (N−1) circulation currents flowing through N converters as elements and an $N^{th}$-order square matrix.

8. The power conversion system according to claim 7, wherein the control unit performs current control further including the arithmetic operation using a current vector including the system current and the (N−1) circulation currents as elements.

9. The power conversion system according to claim 7, wherein the control unit performs current control including the arithmetic operation of generating a voltage vector including a synthetic voltage of the power system and reference voltages corresponding to the (N−1) circulation currents as elements.

10. The power conversion system according to claim 1, wherein the control unit includes:
a dq0 transformation unit configured to perform dq0 transformation for transformation into information of a current component in a rotating coordinate system using a reference phase θ0 on the basis of a value of the detected current of the primary side;
a ZC transformation unit configured to perform zc transformation for separating a component of a system current flowing through the power system and a component of a circulation current on the basis of a current component after the dq0 transformation;
a current control unit configured to generate a reference voltage according to current control based on a decided reference current and the component of the system current and the component of the circulation current after the zc transformation;
an inverse ZC transformation unit configured to generate a reference voltage of the rotating coordinate system in association with each stage by performing an inverse zc transformation process related to inverse transformation associated with the zc transformation;
an inverse dq0 transformation unit configured to perform inverse dq0 transformation related to inverse transformation associated with the dq0 transformation using the reference phase θ0 with respect to the reference voltage of the rotating coordinate system of each stage and generate a reference voltage of each stage of a stationary coordinate system; and
a PWM control unit configured to generate a gate signal for controlling each switching element of the specific converter on the basis of a triangular wave carrier signal and the reference voltage of each stage.

11. The power conversion system according to claim 1, comprising a three-phase open delta-connected transformer in which primary-side windings are three-phase star-connected wires and secondary-side windings are isolated from each other,
wherein the plurality of converters are connected to the secondary-side windings, and
wherein three-phase AC power is supplied from the power system to the primary-side windings.

12. A power conversion system interconnected to a multi-phase AC power system, the power conversion system comprising:
first and second converters provided in parallel for each phase of the power system; and
a control unit configured to control the first and second converters according to carrier comparison type PWM control using a plurality of carrier signals including first and second carrier signals having a prescribed phase difference from each other,
wherein the control unit detects a current of a primary side of the first and second converters at four or more even-numbered timings when the four or more even-numbered timings are defined at prescribed time intervals during one cycle of the first carrier signal,
wherein the control unit generates a reference voltage for the PWM control using a value of the detected current of the primary side and a value of a reference current of the primary side and updates the reference voltage at each of the four or more even-numbered timings, and
wherein the control unit controls the first converter using the first carrier signal and the updated reference voltage and controls the second converter using the second carrier signal and the updated reference voltage.

13. A power conversion control method for use in a power conversion system interconnected to a multi-phase AC power system, the power conversion control method causing a computer to:
in a carrier comparison type PWM control process of controlling a plurality of switches included in a plurality of converters provided in parallel for each phase of the power system using a plurality of carrier signals having a prescribed phase difference from each other,
detect a current of a primary side of the plurality of converters at each of four or more even-numbered timings when the four or more even-numbered timings are defined at prescribed time intervals during one cycle of a specific carrier signal among the plurality of carrier signals,
generate a reference voltage for the PWM control using a value of the detected current of the primary side and a value of a reference current of the primary side and update the reference voltage at each of the four or more even-numbered timings, and control a specific converter among the plurality of converters using the specific carrier signal and the updated reference voltage.

\* \* \* \* \*